Dec. 13, 1949  J. S. NEWTON ET AL  2,491,200
TURBINE DRIVEN LOCOMOTIVE APPARATUS
Filed Aug. 13, 1946  5 Sheets-Sheet 1

INVENTORS
JOHN S. NEWTON
THOMAS J. PUTZ
BY
ATTORNEY

Dec. 13, 1949 J. S. NEWTON ET AL 2,491,200
TURBINE DRIVEN LOCOMOTIVE APPARATUS
Filed Aug. 13, 1946 5 Sheets-Sheet 4

WITNESSES:

INVENTORS
JOHN S. NEWTON
THOMAS J. PUTZ
BY
ATTORNEY

Dec. 13, 1949  J. S. NEWTON ET AL  2,491,200
TURBINE DRIVEN LOCOMOTIVE APPARATUS

Filed Aug. 13, 1946  5 Sheets-Sheet 5

WITNESSES:
J. X. Mosser
V. W. Novak

INVENTORS
JOHN S. NEWTON
THOMAS J. PUTZ
BY
A. B. Revis
ATTORNEY

Patented Dec. 13, 1949

2,491,200

UNITED STATES PATENT OFFICE 2,491,200

TURBINE DRIVEN LOCOMOTIVE APPARATUS

John S. Newton, Lansdowne, and Thomas J. Putz, Upper Darby, Pa., assignors to Westinghouse Electric Corporation, East Pittsburgh, Pa., a corporation of Pennsylvania Application August 13, 1946, Serial No. 690,228

13 Claims. (Cl. 290—52)

The invention relates to a locomotive wherein power is electrically transmitted from an elastic fluid turbine to traction wheels and it has for an object to provide a power unit wherein a bed structure carries a turbine and generators, arranged in side-by-side relation and connected to the turbine by reduction gearing, together with means for supporting the bed structure at three points with respect to the locomotive frame so that the latter is capable of deflecting in a variety of ways without deforming the bed structure with the result that the axial alignments and parallelism of rotating parts carried by the bed structure are not disturbed.

A further object of the invention is to provide apparatus of the above character wherein the generator casings form parts of the bed structure.

Another object of the invention is to provide a power unit of the above character wherein the bed structure is formed with means for supplying air to the interiors of the generators and which means is connected by a flexible joint to an air supply conduit carried by the locomotive frame.

A more particular object of the invention is to provide a power unit of the above character wherein the bed structure extends lengthwise of the locomotive frame with two of the points of support between the bed structure and the frame constituted by hinged connections at opposite sides of the bed structure and near one end thereof and by a connection disposed midway widthwise of the bed structure near the other end thereof and which is capable of elastic deformation torsionally, longitudinally, and laterally in all directions, the hinge and deformable connections accommodating for relative movements of the frame and bed structure at the points of support with the result that the bed structure is supported at all three points by the frame without the transmission of deflecting stresses from the latter to the former.

A further object of the invention is to provide a power unit, as aforesaid, wherein the bed structure defines a compartment for a pinion driving a pair of gears, has beam elements supporting the generators in axial alignment with the gears and in side-by-side relation, and supports the turbine in an outboard manner at one end with the turbine axially aligned with the pinion and connected to the latter.

A further object of the invention is to provide, for a locomotive frame, a fabricated bed structure for a turbine, generators, and reduction gearing connecting the turbine to the generators and which bed structure is supported at three points by the locomotive frame and includes plates protruding from one end thereof to provide a support for the turbine, such protruding plates having webs extending vertically and horizontally so as to accommodate for expansion and contraction of the turbine both vertically and horizontally while maintaining the turbine axis in vertical and horizontal planes which are fixed with respect to the bed structure, whereby the bed structure is supported by the locomotive frame and supports the turbine so that the locomotive frame may weave or deflect and the turbine may contract and expand without disturbing alignments and parallelism of the rotating parts.

Another object of the invention is to provide a unitary power unit of the above character including a bedplate structure connected to the locomotive frame by a three-point supporting connection wherein the bedplate structure comprises longitudinally and transversely-extending plates or beam elements connected together to form supports for the side-by-side arrangement of generators, to form at one end a cantilever supporting structure for the turbine, to form a compartment for reduction gearing connecting the turbine to the generators, and to define a space between the gearing and the turbine for the accommodation of essential auxiliaries, such as the governor and the oil pump supplying oil for lubrication and governor operation.

Still another object of the invention is to form the three-point supported bed structure of the aforesaid power unit with parallel middle and outer beam elements for supporting the generators in side-by-side relation, the middle beam element having its top edge higher than the top edges of the outer beam elements and the generators having feet arranged above and below their axes and bearing, respectively, on the middle beam top edge and the outer beam top edges in order that, for the transverse space available, the generators may be placed close together to provide for generators of maximum outside diameter.

These and other objects are effected by the invention as will be apparent from the following description and claims taken in connection with the accompanying drawings, forming a part of this application, in which:

Figures 1, 2, 3:
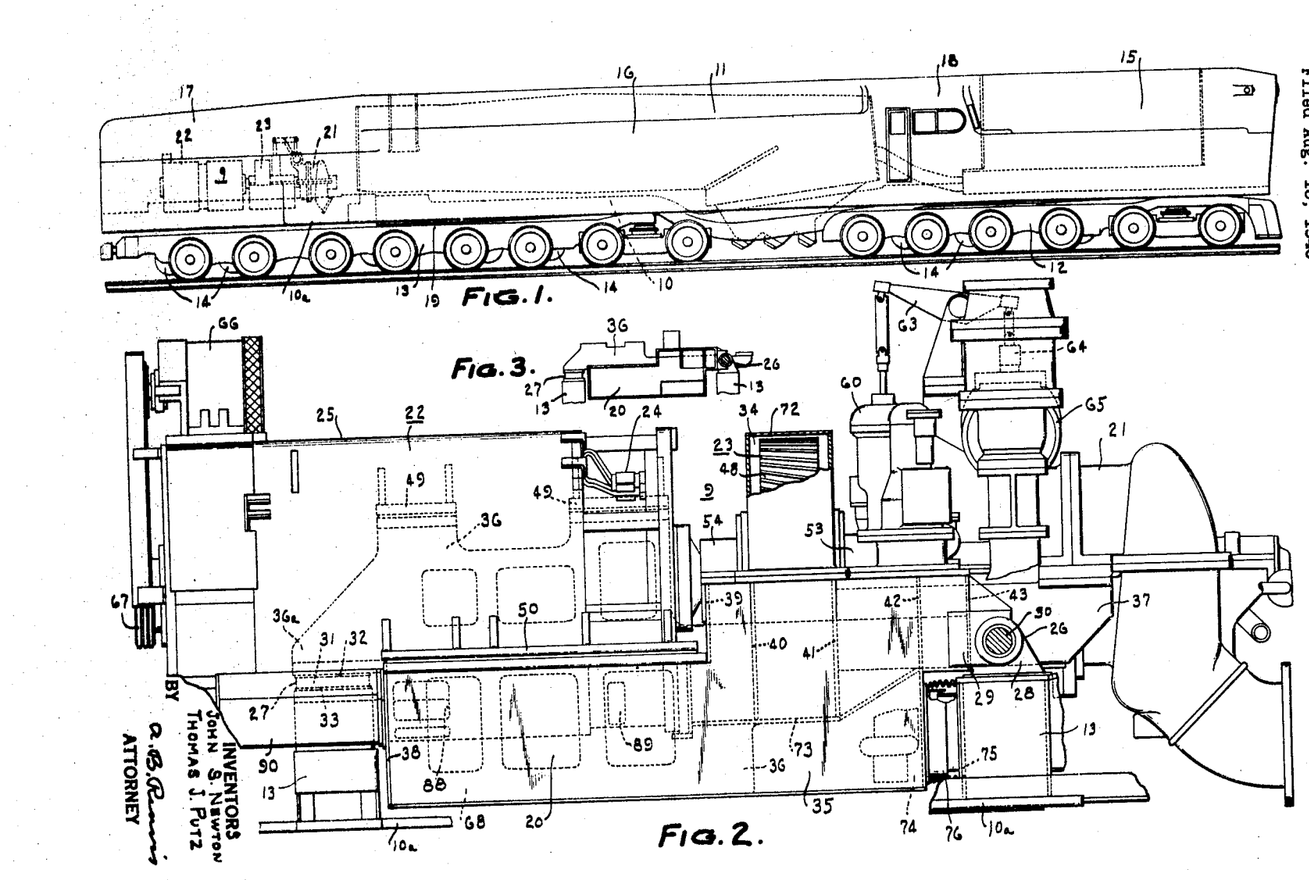
Fig. 1 is a diagrammatic view of a locomotive equipped with the improved power unit.
Fig. 2 is a side elevational view of the power unit.
Fig. 3 is a diagrammatic view illustrating the three-point connection between the power unit bed structure and the locomotive frame.

The invention is concerned with the power unit, at 9, and its relation to the frame or chassis 10 of a locomotive shown, for example, as comprising the body 11 supported by front and rear trucks 12 and 13 equipped with traction motors 14, the body being divided into a front coal bunker section 15, a central boiler section 16 and a rear power unit section 17 and being provided with a cab 18 between the bunker and boiler sections. The power unit, at 9, has a three-point supporting connection with respect to the rear cantilever portion 10a of the frame overhanging the bolster and king pin connection 19 between the rear truck and the frame.

The power unit, at 9, includes a fabricated bed structure 20 carrying a turbine 21, direct current generators 22 arranged in side-by-side relation and supplying load current for the traction motors 14, and reduction gearing 23 connecting the turbine and the generators. Each generator 22 is preferably of the double type, that is, it has two armatures arranged in end-to-end relation with commutator and brush aggregates 24 at the outer ends and a single field frame or casing 25, the field frames or casings functioning, as hereinafter pointed out, as stiffening and stress bearing components of the bed structure. The bed structure 20 extends lengthwise of the overhanging or cantilever portion 10a of the locomotive frame and it has said three-point supporting connection with respect to the latter so that deflection of the frame may take place without stressing the bed structure.

Figures 4, 5:
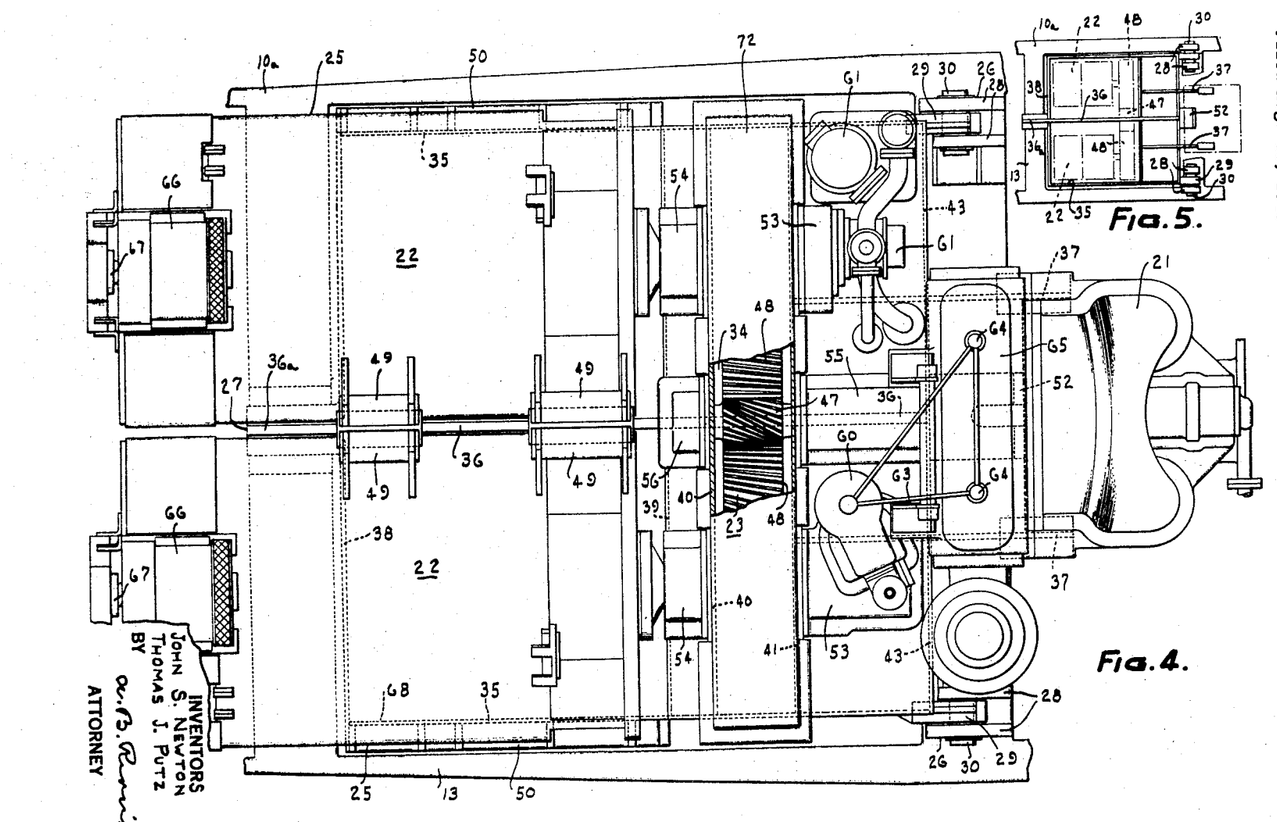
Fig. 4 is a plan view of the turbine, gearing and generator bed structure shown in relation to fragmentary portions of the locomotive frame.
Fig. 5 is a diagrammatic plan view more clearly illustrating the three-point connection between the bed structure and the locomotive frame.
Figure 6:
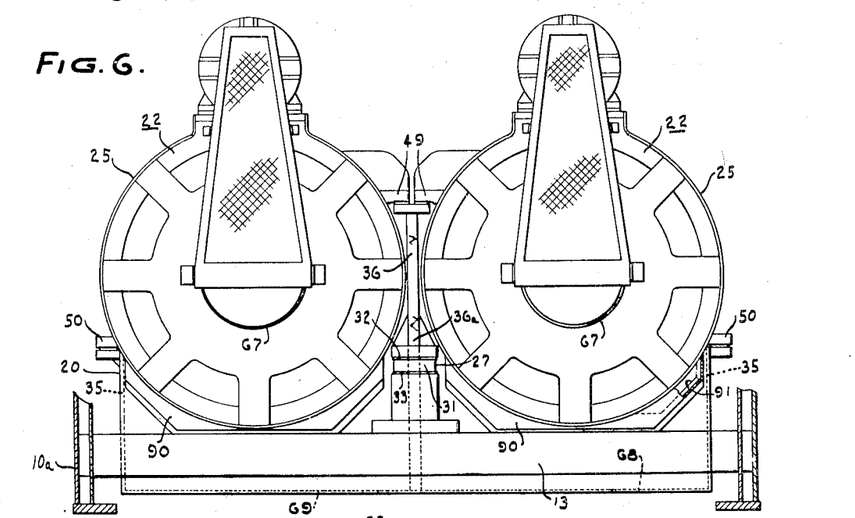
Fig. 6 is an elevational view of the power unit viewed from the generator end and showing the single central connection between one end of the bed structure and the locomotive frame.

Two of the three points of support are constituted by the hinge connections 26—26 near one end of the bed structure and at opposite sides of the latter, and the third point of support is constituted by a structure 27 capable of yielding longitudinally, torsionally and laterally in all directions and located near the other end of the bed structure substantially midway of the width of the latter.

The hinged connections 26—26 are shown as being comprised by clevis elements 28 attached to the locomotive frame, tongue elements 29 unitary with the bed structure, and pivot pins 30, the clevis and tongue elements being positioned so that the pivot pins extend horizontally and transversely with respect to the locomotive frame.

The longitudinally, torsionally and laterally yieldable connection 27 is preferably constituted by a block of rubber 31 vulcanized to upper and lower plates 32 and 33 attached, respectively, to the bed structure and to the locomotive frame.

The fabricated bed structure 20 includes plates or beam elements extending transversely and longitudinally of the locomotive frame and generator casings extending longitudinally of such frame, the plate or beam elements and the generator casings being connected together to form a structure having adequate strength and stiffness in all directions.

Figure 7:
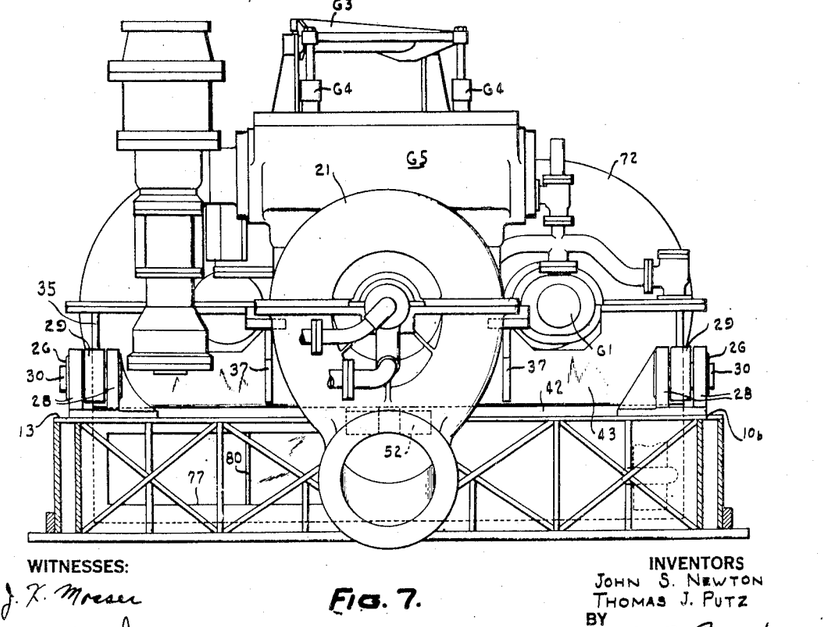
Fig. 7 is an elevation of the power unit viewed from the turbine end and showing the hinge or clevis connections between the bed structure and the locomotive frame.

The hinged connections are located at the end of the power unit near to the supported end of the cantilever portion 10a of the locomotive frame and the clevis elements 28 of such connections are carried by a truss portion 10b (Fig. 7) of the frame and which truss portion is stiff laterally in all directions and torsionally. Therefore, with the rubber support at the end of the power unit remote from the supported end of the cantilever frame portion, accommodation for relative deflection, including warping or torsional deflection of the cantilever portion, is provided so that imposition of deforming stresses on the bed structure are avoided.

Figures 8, 9, 10, 11:
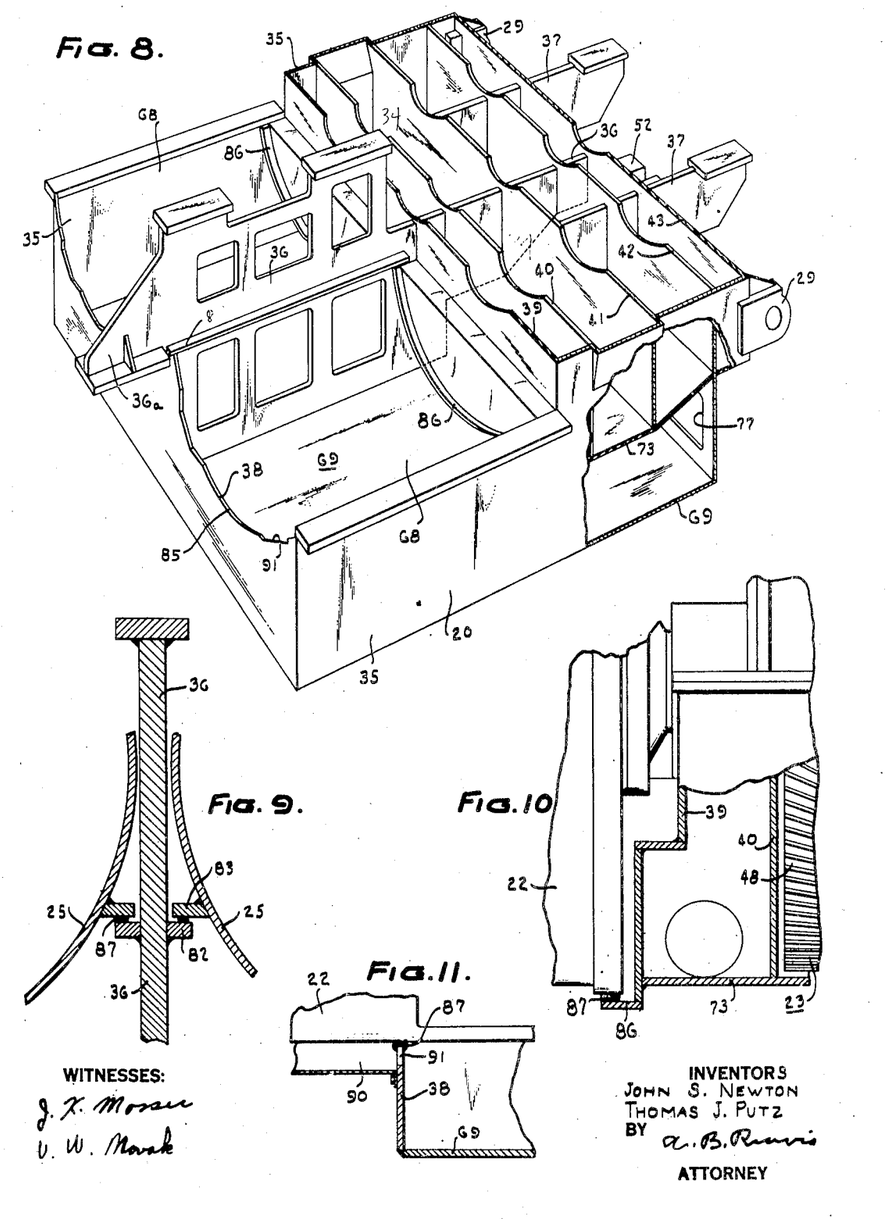
Fig. 8 is a perspective view of the fabricated bed structure.
Figs. 9, 10 and 11 are detail views showing the generator and bed structure sealing feature.
Figure 12:
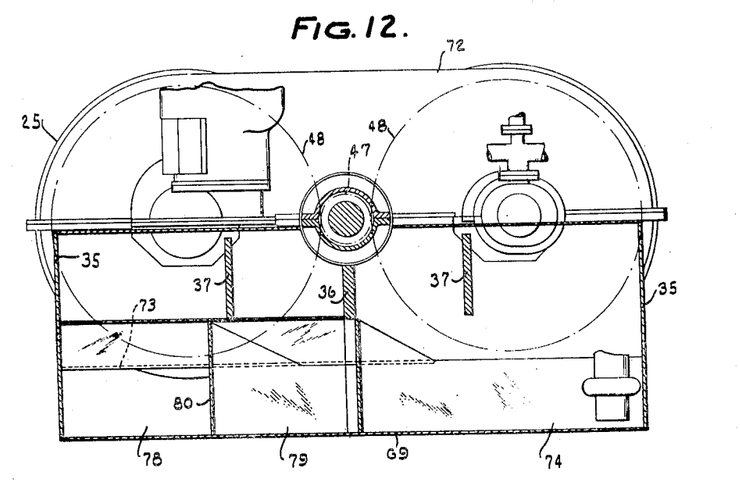
Figs. 12 and 13 are sectional views showing the formation of the bed structure to provide the gear oil reservoir and the air supply passages which communicate with the plenum chamber.
Figure 13:
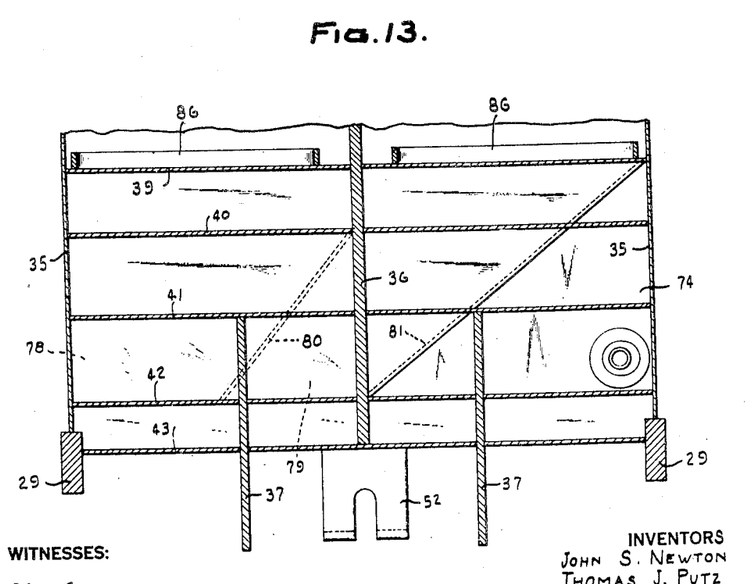

The bed structure includes longitudinal plates or beam elements 35—35, 36, and 37—37 and transverse plate or beam elements 38, 39, 40, 41, 42 and 43. All of the transverse plate or beam elements are connected at their outer ends to the outer longitudinal beam or plate elements 35—35 and at their mid sections to the middle longitudinal beam or plate element 36. The longitudinal cantilever plate or beam elements 37—37 are located between the middle and the outer longitudinal plate or beam elements and they are connected to the transverse plate or beam elements 41, 42 and 43.

The forward ends of the side plate or beam elements 35—35 are joined to the tongue structures 29—29 of the hinged connections 26—26 and the middle beam or plate element 36 has a rearward extension 36a forming a foot carried by the elastically deformable connection 27.

The transverse plates 40 and 41 define a transversely elongated compartment 34 for the reduction gearing 23 comprised by the driving pinion 47 and the driven gears 48—48 meshing with opposite sides of the pinion.

The transverse plates 38 and 39 cooperate with the outer plates 35—35 and the middle plate 36 to define spaces for accommodation of the generators 22—22 axially aligned with the gears 48—48 and connected to the latter. The top edge of the generator space portion of the middle plate or beam element 36 is preferably higher than the top edges of the side plate or beam elements 35—35 and the generators have upper feet 49 arranged above their axes and secured to the top edge of the middle beam element and have lower feet 50 arranged below their axes and attached to the top edges of the side plates or beam elements, this arrangement providing a maximum over-all generator diameter in the space available for the reason that the generators may be arranged as close together as the thickness of the web of the middle plate or beam element will permit. As the generator casings are parallel to the middle and outer plate or beam elements 36 and 35—35 and are fastened thereto, they contribute stiffness to the bed structure in all directions.

The plates 37—37 protrude from one end of the bed structure and support the turbine so that the latter may be axially aligned with and connected to the pinion. As the plates 37—37 are stiff vertically in relation to the bed structure and are capable of deflecting laterally or horizontally, they function to accommodate for horizontal and radial expansion and contraction of the turbine while preventing vertical displacement thereof.

The bed structure also includes a horizontal protruding plate 52 connected to the turbine, such plate accommodating for vertical expansion and contraction of the turbine but preventing horizontal displacement thereof.

The plates 37—37 and 52, therefore, confine the turbine axis in horizontal and vertical planes which are fixed in relation to the bed structure while they accommodate for radial expansion and contraction of the turbine in all directions.

The transverse plates 39—40 and 41 carry aligned bearings 53 and 54 for the gears 48—48 and aligned bearings 55 and 56 for the pinion 47. The bed structure flexible plates 37—37 and 52 support the turbine so as to maintain its axis aligned with the pinion and its bearings 55 and 56.

The bed structure space between the transverse plates 41 and 42 is used to accommodate essential auxiliaries of the power unit, such as the governor 60 and the oil pumps 61 supplying oil for lubrication and governor operation. The governor is connected by lever means 63 to valves 64—64 of the valve chest 65 carried by the turbine.

The exciters 66 for the generators are supported on the latter and driven therefrom by any suitable means, for example, by belt gearing 67.

The fabricated bed structure 20 is stiff in all directions. This generator field frames 25—25 overhang the commutators with the result that they function as stiffening structures from the rear of the bed structure to a box girder section accommodating the gearing and the auxiliaries and providing an oil chamber and air passages communicating with the air plenum chamber hereinafter described. Such box girder section is defined by the plates 39, 40, 41, 42 and 43 joined to the outer and middle plates 35—35 and 36 and by the cantilever turbine support plates 37—37 joined to the plates 41, 42 and 43.

The bed structure is readily formed to provide a plenum chamber to furnish air to the generators for cooling and a lubricating oil reservoir or sump. To this end, the generators, when assembled, cover the plenum chamber 68 formed by the side plate or beam elements 35 and the bottom plate 69.

A cover 72 and a bottom plate 73 cooperate with the side plate or beam elements 35—35 to form the gear compartment as an enclosure from which oil drains to the reservoir or sump 74 in the auxiliary space, the oil pump being arranged to withdraw oil from the sump.

An air duct 75, unitary with the locomotive frame, is connected by a flexible joint 76 to supply air from a blower (not shown) through an opening 77 and passages 78 and 79 to the plenum chamber 68. The latter passages are defined by one side plate 35, the bottom plate 69, the gear compartment bottom 73 and the diagonal partitions 80 and 81. In addition to the flexible joint 76, all piping including that for steam, is connected to the power unit in a flexible manner to avoid any effect thereof on the three-point support.

Reference has already been made to the relation of the generators covering the plenum chamber. To this end, flanges 82 and 83 are provided on the middle beam element 36 and on the generators at the horizontal level of the top edges of the outer plates or beam elements 35—35 and the transverse plate or beam elements 38 and 39 are concaved at 85 and 86 to suit the generator cylindrical exterior. A rubber gasket 87 between the flanges 82 and 83, the exteriors of the generators and the concavities, and the feet 50 and the top edges of the outer plates or beam elements 35—35 provide for sealed covering of the plenum chamber by the generators.

Each generator casing or frame has bottom openings 88 through which air is supplied from the plenum chamber to the generators for cooling purposes. Air enters the center section of each generator to cool the latter and then passes through the brush assemblies at each end to remove dust and carbon particles; however, as the air is increased in temperature because of this cooling action, to assure of satisfactory brush cooling, additional air is supplied for this purpose, openings 89 being provided to furnish air to the forward brush compartments and the rear brush compartments are furnished with air by the ducts or chambers 90 communicating with the plenum chamber through openings 91 formed in the plate 38. Thus, brush cooling is due to both supplies, the air entering at the center first absorbing heat from the armature and field elements and then, in addition to dust removal from the brushes, cooling the latter to the extent of its capacity and being aided in the achievement of the latter purpose by the directly supplied air.

While the invention has been shown in but one form, it will be obvious to those skilled in the art that it is not so limited, but is susceptible of various changes and modifications without departing from the spirit thereof.

What is claimed is:

1. In an electric locomotive power unit, the combination of, a bed structure, a turbine carried by the bed structure, gearing carried by the bed structure and including a pinion connected to the turbine and meshing with a pair of gears disposed at opposite sides of the latter, generators carried by the bed structure in side-by-side relation and connected to the respective gears, and a three-point support for the bed structure and operative to prevent the imposition of deforming stresses on the latter.

2. Apparatus as claimed in claim 1 wherein the bed structure is fabricated from plate members joined together and has protruding from one end thereof a cantilever turbine support comprising a pair of plate members connected to opposite sides of the turbine and having vertical webs and a plate member connected to the turbine underneath the latter and having a horizontal web, the plate members of said pair providing for expansion and contraction of the turbine radially while confining its axis to a horizontal plane and the plate member of said support having a horizontal web providing for expansion and contraction of the turbine radially while confining its axis to a vertical plane.

3. Apparatus as claimed in claim 1 wherein the bed structure is comprised by plate beams extending longitudinally and transversely and having their webs extending vertically, a pair of said transverse plate beams being spaced to define a compartment for the pinion and the pair of gears, and bearings carried by the spaced transverse plate beams and supporting the pinion and the gears.

4. In an electric locomotive power unit, the combination of, a bed structure, a turbine carried by the bed structure, gearing carried by the bed structure and including a pinion connected to the turbine and meshing with a pair of gears disposed at opposite sides of the latter, generators carried by the bed structure in side-by-side relation and connected to the respective gears, said bed structure including longitudinally-extending members connected by transversely-extending members and by the casings of the generators so as to have adequate stiffness in all directions, and a three-point support for the bed structure and operative to prevent the imposition of deforming stresses on the latter.

5. In an electric locomotive power unit, the combination of, a bed structure, a turbine carried by the bed structure, gearing carried by the bed structure and including a pinion connected to the turbine and meshing with a pair of gears disposed at opposite sides of the latter, generators carried by the bed structure in side-by-side relation and connected to the respective gears; said bed structure including longitudinally-extending members connected by transversely-extending members and by the casings of the generators so as to have adequate stiffness in all directions, said bed structure being formed to provide a plenum chamber covered by the generators and a passage communicating with the plenum chamber, an air supply conduit including a flexible portion connected to the bed structure so as to communicate with said passage; means providing for flow of air from the plenum chamber to the interiors of the generators, and a three-point support for the bed structure and operative to prevent the imposition of deforming stresses on the latter.

6. In an electric locomotive power unit, the combination of, a bed structure which is approximately rectangular in horizontal section, a turbine carried by the bed structure, gearing carried by the bed structure and including a pinion connected to the turbine and meshing with a pair of gears disposed at opposite sides of the latter, generators carried by the bed structure in side-by-side relation and connected to the respective gears, pivot connections for the lower corners of the bed structure at one end of the latter for supporting the bed structure and having their pivot axes extending transversely of the bed structure, and a supporting connection for the other end of the bed structure and located substantially midway of the width of the bed structure, said last-named connection being comprised by means capable of elastic deformation torsionally, transversely in all directions, and longitudinally.

7. Apparatus as claimed in claim 6 wherein the elastically deformable connection is comprised by a block of rubber joined to upper and lower attachment plates with the upper plate attached to the bed structure.

8. In an electric locomotive power unit, the combination of, a bed structure, a turbine carried by the bed structure, gearing carried by the bed structure and including a pinion connected to the turbine and meshing with a pair of gears disposed at opposite sides of the latter, generators carried by the bed structure in side-by-side relation and connected to the respective gears; said bed structure comprising longitudinally and transversely-extending plates joined together and having vertical webs, said longitudinally-extending plates including parallel middle and outside plates and cooperating with said transversely-extending plates to define compartments for the generators and a compartment for the pinion and the gears; bearings for the pinion and the gears and carried by the spaced transverse plates defining the compartment therefor; said bed structure also comprising a cantilever turbine support which includes a pair of said longitudinally-extending plates having their outer ends attached to opposite sides of the turbine and a longitudinally-extending plate having a horizontal web and having its outer end attached to the turbine underneath the latter; and a three-point support for the bed structure and operative to prevent the imposition of deforming stresses on the latter.

9. In an electric locomotive power unit, the combination of a bed structure, a turbine carried by the bed structure, one or more generators carried by the bed structure; hinged supporting connections for one end of the bed structure and located at opposite sides of the latter; and a supporting connection for the other end of the bed structure; the last-named connection being connected to the bed structure midway of the width of the latter and being deformable elastically longitudinally, laterally in all directions, and torsionally.

10. In an electric locomotive power unit, the combination of, a bed structure, a turbine carried by the bed structure, gearing by the bed structure and including a pinion connected to the turbine and meshing with a pair of gears disposed at opposite sides of the latter, generators carried by the bed structure in side-by-side relation and connected to the respective gears; said bed structure including a middle longitudinal beam element and outer beam elements parallel to the latter and the top edge of the middle beam element being higher than the top of the outer beam elements; said generators each having upper and lower lateral feet arranged above and below the axis thereof, with the upper feet of the generators bearing on and attached to the top edge of the middle beam element and the lower feet thereof bearing on and attached to the upper edges of the outer beam elements; and a three-point support for the bed structure and operative to prevent the imposition of deforming stresses on the latter.

11. In an electric locomotive power unit, the combination of, a bed structure, a turbine carried by the bed structure, one or more generators carried by the bed structure; a three-point support for the bed structure and operative to prevent the imposition of deforming stresses on the latter; said bed structure being formed to provide a plenum chamber covered by the generator or generators; an air supply conduit including a flexible joint connected to the plenum chamber for supplying air to the latter; and means including openings formed in the housing of each generator for supplying air from the plenum chamber to the latter.

12. In an electric locomotive power unit, the combination of a fabricated bed structure, a turbine, a pair of generators arranged in side-by-side relation and having their axes parallel to the turbine axis and spaced at equal distances to either side of the latter, and gearing including a pinion connected to the turbine and a pair of gears meshing with opposite sides of the pinion and connected to the generators; said bed structure comprising longitudinally and transversely-extending plate elements and the casings of the generators and the webs of the plate elements extending vertically; said longitudinally-extending plate elements including middle and outer plate elements joined by the generator casings and by the transversely-extending plate elements and the latter plate elements cooperating with the longitudinally-extending plate elements to form a box girder section of the bed structure extending from the forward ends of the generators to the forward end of such bed structure; bearings for the pinion and the gears carried by spaced transverse plate elements defining a compartment for the gearing; said bed structure also comprising a cantilever turbine support which includes a pair of said longitudinally-extending plate elements having their outer ends attached to opposite sides of the turbine and a longitudinally-extending horizontal plate element having its outer end attached to the turbine underneath the latter; and a three-point support for the bed structure and operative to prevent the imposition of deforming stresses on the latter.

13. In an electric locomotive power unit, the combination of, a fabricated bed structure, a turbine, a pair of generators arranged in side-by-side relation and having their axes parallel to the turbine axis and spaced at equal distances to either side of the latter, and gearing including a pinion connected to the turbine and a pair of gears meshing with opposite sides of the pinion and connected to the generators; said bed structure comprising longitudinally and transversely-extending plate elements and the casings of the generators and the plate elements having vertically-extending webs; said longitudinally-extending plate elements including middle and outer plate elements joined by the generator casings and by the transversely-extending plate elements and the latter plate elements cooperating with the longitudinally-extending plate elements to form a box girder section of the bed structure extending from the forward ends of the generators to the forward end of such bed structure; bearings for the pinion and the gears carried by spaced transverse plate elements defining a compartment for the gearing; said bed structure also comprising a cantilever turbine support which includes a pair of said longitudinally-extending plate elements having their outer ends attached to opposite sides of the turbine and a longitudinally-extending horizontal plate element having its outer end attached to the turbine underneath the latter; hinged connections for the forward lower corners of the box girder section of the bed structure; a foot extending rearwardly of the bed structure and formed in part by the middle plate element; and a supporting connection for the foot and including means which is elastically deformable longitudinally, laterally in all directions, and torsionally.

JOHN S. NEWTON.
THOMAS J. PUTZ.

REFERENCES CITED

The following references are of record in the file of this patent:

UNITED STATES PATENTS

| Number | Name | Date |
|---|---|---|
| 908,662 | Guy | Jan. 5, 1909 |
| 1,295,644 | Ver Planck | Feb. 25, 1919 |
| 1,648,875 | Griese | Mar. 8, 1927 |
| 1,878,312 | Morch | Sept. 6, 1932 |
| 2,118,814 | Alzworth | May 31, 1938 |
| 2,298,309 | Ray | Oct. 3, 1942 |
| 2,464,357 | Stearns | Mar. 15, 1949 |

Certificate of Correction

Patent No. 2,491,200      December 13, 1949

JOHN S. NEWTON ET AL.

It is hereby certified that errors appear in the printed specification of the above numbered patent requiring correction as follows:

Column 8, line 32, after "gearing" insert *carried*; line 67, after the word "of" and before "a" insert a comma; column 10, line 34, list of references cited, for "Mar. 8, 1927" read *Nov. 8, 1927*; line 35, for the patent number "1,878,312" read *1,876,312*; line 36, for "Alzworth" read *Holzworth*; line 37, for "Oct. 3, 1942" read *Oct. 13, 1942*; and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*